United States Patent [19]

Sato

[11] Patent Number: 4,941,184
[45] Date of Patent: Jul. 10, 1990

[54] IMAGE-PROCESSING SYSTEM WITH CHARACTER READER AND AN IMAGE-PROCESSING METHOD

[75] Inventor: Toyoshi Sato, Tokyo, Japan

[73] Assignee: Kabushiki Kaisha Toshiba, Kawasaki, Japan

[21] Appl. No.: 226,471

[22] Filed: Aug. 1, 1988

[30] Foreign Application Priority Data

Aug. 13, 1987 [JP] Japan .................... 62-202382

[51] Int. Cl.$^5$ .............................. G06K 9/00
[52] U.S. Cl. ........................ 382/17; 382/61; 358/78; 358/80
[58] Field of Search .............. 382/17, 61; 358/78, 358/80, 48, 50

[56] References Cited

U.S. PATENT DOCUMENTS

| | | | |
|---|---|---|---|
| 3,444,517 | 5/1969 | Rabinow | 382/17 |
| 3,820,067 | 6/1974 | Shepard | 382/17 |
| 4,386,267 | 5/1983 | Yamada | 358/80 |
| 4,658,289 | 4/1987 | Nagano et al. | 358/80 |
| 4,673,972 | 6/1987 | Yokomizo | 358/78 |

*Primary Examiner*—Leo H. Boudreau
*Assistant Examiner*—Yon Jung

*Attorney, Agent, or Firm*—Foley & Lardner, Schwartz, Jeffery, Schwaab, Mack, Blumenthal & Evans

[57] ABSTRACT

A slip has a sample area which has a print of the drop-out colors used for the slip. A facsimile apparatus receives the image of the slip from a different facsimile apparatus. The facsimile apparatus produces a printed paper sheet, which is input to a character reader for photoelectric conversion into image data. Image data is stored in a memory. An image of the sample area is transferred to the area buffer. The detector detects the number of black dots in the dots constituting the image of the sample area stored in the area buffer. The detector compares the detected black dot number to a reference value. The detector determines that the drop-out colors have failed to be dropped out when the black dot number is greater than the reference value. The detector determines that the drop-out color was dropped out when the black dot number is smaller than the reference value. When the detector determines that the drop-out colors have been dropped out, the character reader reads out characters contained in the slip image stored in the memory. When the detector determines that the drop-out colors have not been dropped out, the character reader does not read out the characters entered in the slip and feed out the input paper sheet.

14 Claims, 5 Drawing Sheets

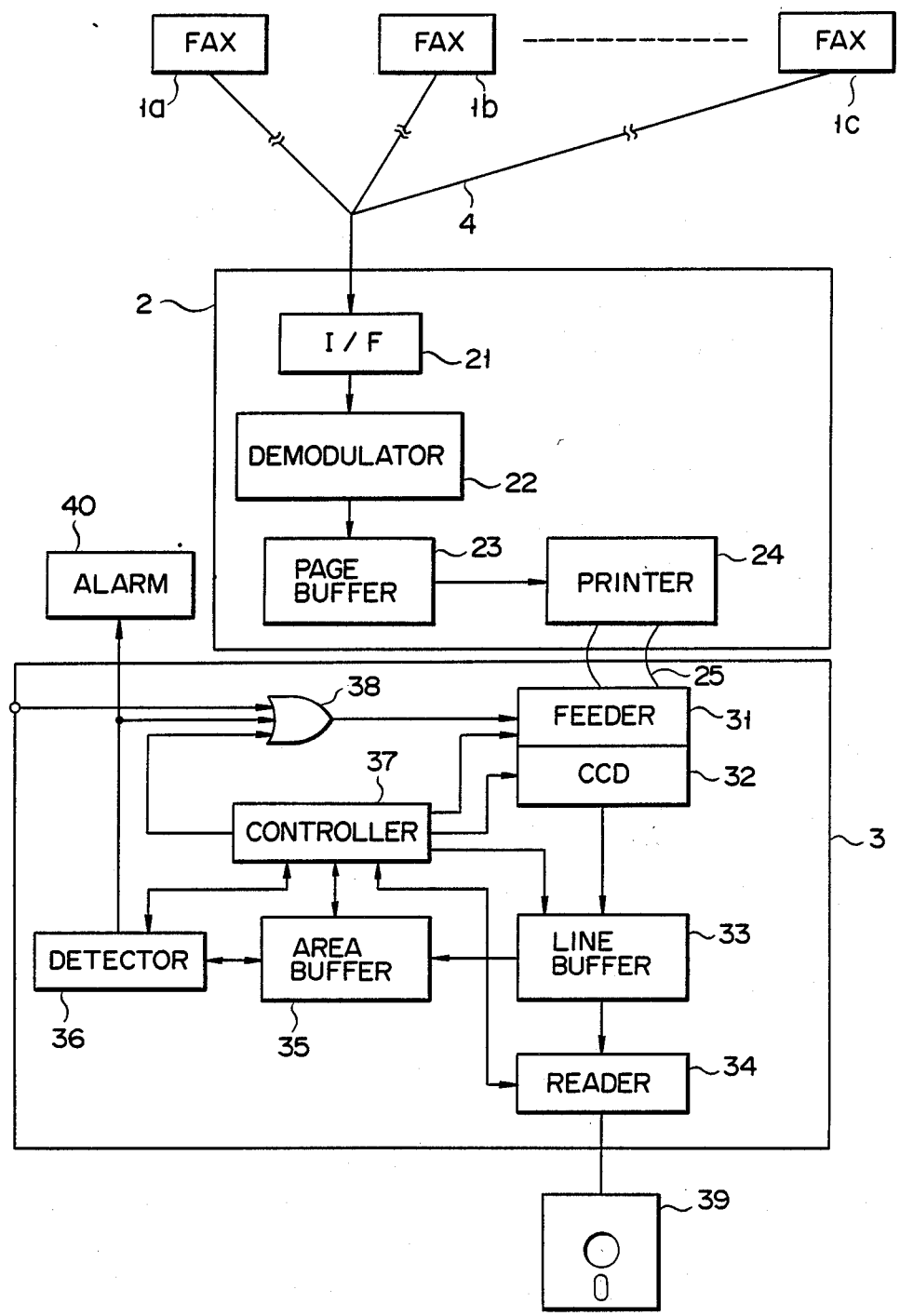
F I G. 1

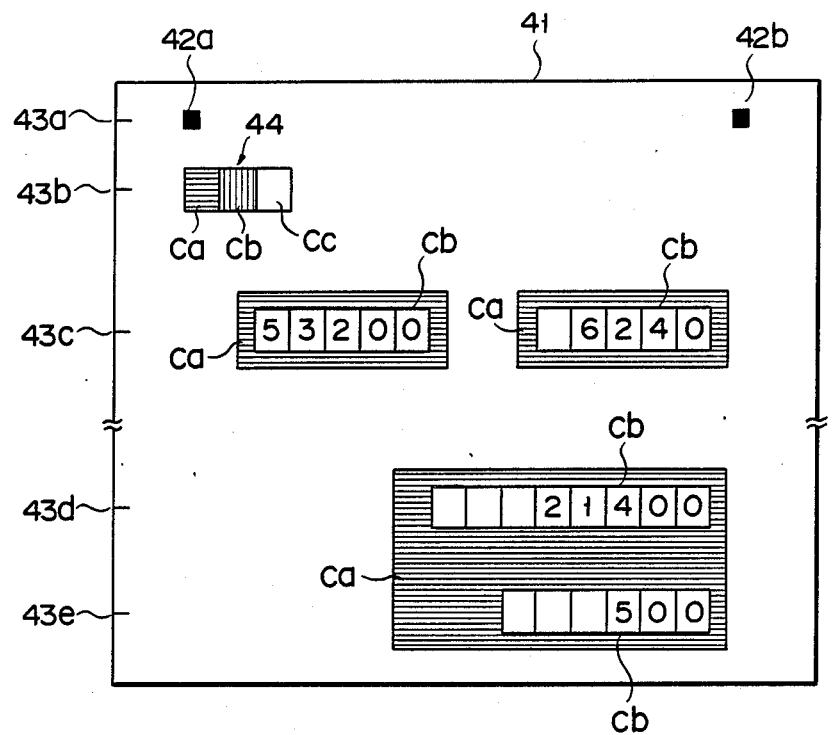
F I G. 2

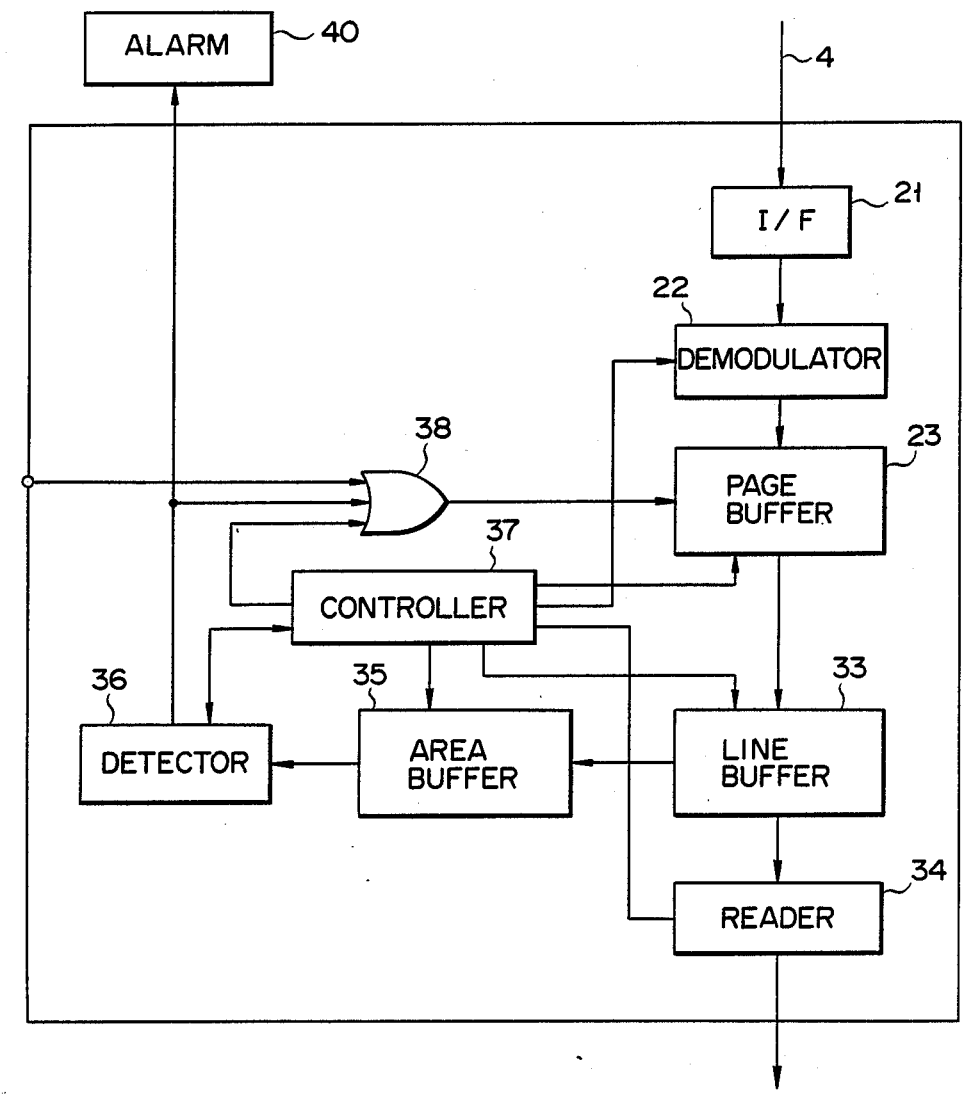
F I G. 4

IMAGE-PROCESSING SYSTEM WITH CHARACTER READER AND AN IMAGE-PROCESSING METHOD

BACKGROUND OF THE INVENTION

1. Field of the Invention

This invention relates to an image-processing system for image-processing slips using drop-out colors.

2. Description of the Related Art

Character readers deal with slips, on which frames and symbols are printed in commonly termed drop-out colors. The drop-out color means a color which can not be sensed by photoelectric converters of the character reader. When a slip with frames and symbols printed in drop-out colors is inputted to a character reader, the character reader reads out only entered characters through photoelectric conversion by ignoring what is printed with drop-out colors.

In the event if a drop-out color used for a slip is not dropped out for some reason, the frames and symbols printed in such drop-out color on the slip are inputted to a character recognition section of the character reader. In this case, the character recognition section can not read out or only partly read out characters entered in the slip. If characters written on a slip can not be read out, it is sometimes more efficient to stop the reading of the character reader and input the written characters from a keyboard or the like. Therefore, if a drop-out color is not dropped out, the pertinent slip should be quickly discharged from the character reader, and this fact (i.e., failure of the drop-out of the drop-out color) should be quickly reported to the operator.

Prior-art photoelectric converters, however, do not have any circuit for checking whether a drop-out color has been dropped out. Therefore, the operator can recognize the failure of drop-out of a drop-out color only when a large number of characters incapable of reading are generated. In addition, in such a case the operator must feed out the slip.

There in well-known a system, in which slip data are transmitted form a plurality of facsimile terminals to a facsimile key station, in which the received image data is read out by a character reader. In such a system, the plurality of facsimile terminals are of various specifications and installed in a variety of places. Therefore, there is high possibility of transmission of slip data to the receiving facsimile apparatus without drop-out of a drop-out color. Again in this case, the frames or the like of the slip are inputted to the character recognition section of the character reader. In such a system, therefore, there is a high demand for the provision of means for checking whether a drop-out color has been actually dropped out.

SUMMARY OF THE INVENTION

An object of the invention is to provide an image-processing system, which can detect the failure of drop-out of a drop-out color used for a slip.

To attain the above object of the invention, there is provided a character reader comprising:

receiver (3) for receiving an image of a slip obtained through photoelectric conversion from an apparatus connected through communication lines, said slip (41) having an area printed in a predetermined drop-out color and a predetermined format, characters being entered in said slip in conformity to said format;

image memory (33) for storing an image received by said receiver (3) represented by a plurality of dots;

character reader (35) connected to said image memory for reading out characters contained in the image stored in said image memory (33);

drop-out determiner (36) connected to said image memory for effecting a check as to whether said drop-out color has been dropped out at the time of said photo-electric conversion according to the image of said print area printed in said drop-out color among the image stored in said image memory (33); and controller (37, 38) for stopping a character-reading operation of said character reader (35) with respect to a slip if said drop-out determiner (36) determines failure drop-out of said drop-out color according to the result of determination of said drop-out determiner.

With the above construction according to the invention, failure of drop-out of any drop-out color can be detected in the event when such failure takes place, so that it is possible to effect subsequent processing speedily.

BRIEF DESCRIPTION OF THE DRAWINGS

FIG. 1 is a block diagram showing an embodiment of the image-processing system according to the invention;

FIG. 2 is a view showing an example of the slip dealt with according to the invention;

FIG. 4 is a block diagram showing the structure of a second embodiment of the image-processing system according to the invention;

DETAILED DESCRIPTION OF THE PREFERRED EMBODIMENTS

Figure 3:
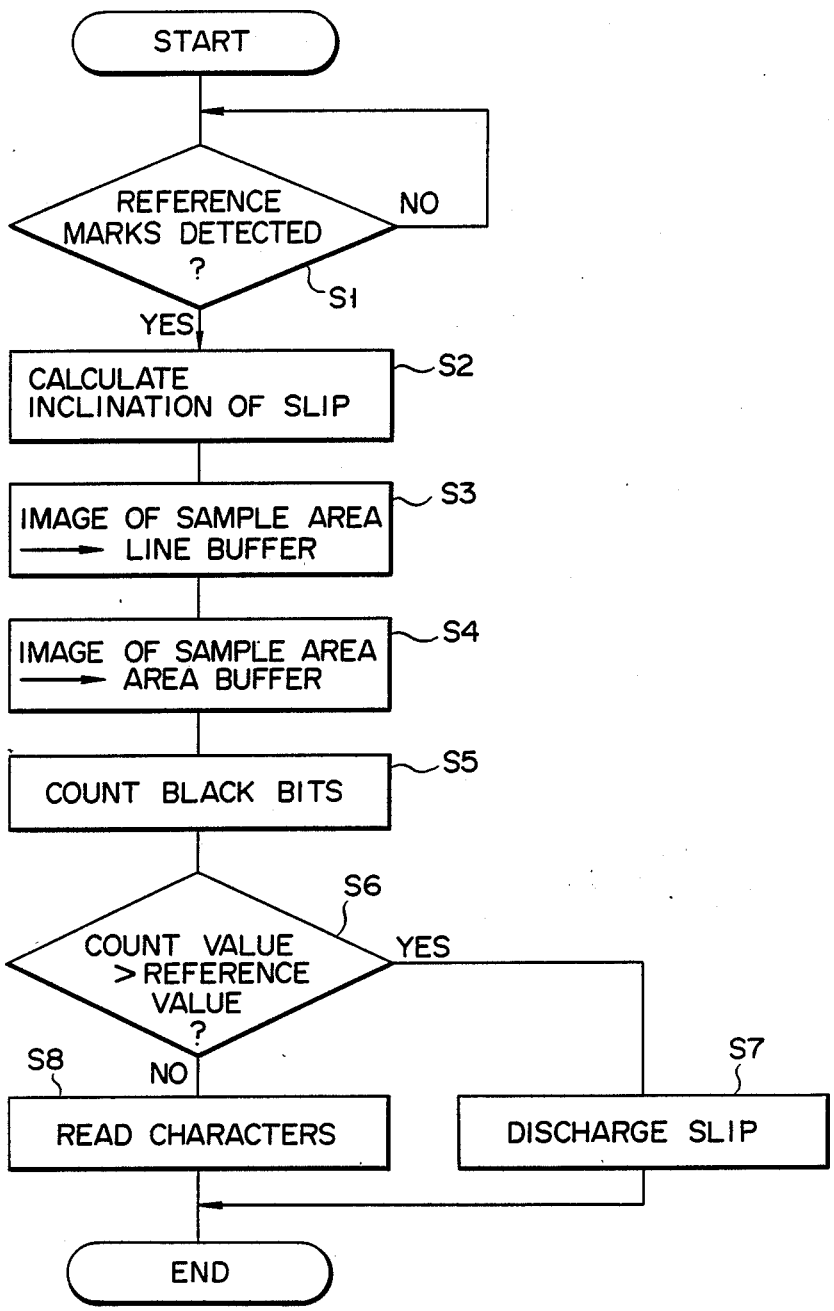
FIG. 3 is a flow chart showing the operation of the system shown in FIG. 1.

A first embodiment of the image-processing system according to the invention will be described with reference to FIG. 1.

A plurality of facsimile apparatuses (hereinafter referred to as FAXs) 1a, 1b, ..., 1c which are installed in various places are connected via communication lines 4 to key FAX 2. Character reader 3 for reading out characters contained in an output image from FAX 2 is connected to FAX 2.

FAX 2 and character reader 3 have constructions which will be described later in detail. Communication lines 4 are connected to input/output interface 21, through which image data or the like is transferred between FAX 2 and communication lines 4. Demodulator 22 for demodulating received data is connected to input/output interface 21. Page buffer memory 23 for storing received image (image data) is connected to demodulator 22. Page buffer memory 23 is a bit map memory with a memory capacity corresponding to one page of slip. Printer 24 is connected to buffer memory 23. Printer 24 prints on paper sheet 25 the image that has been stored in page buffer memory 23. FAX 2 is further provided with a well-known structure (not shown) for image transmission.

The output image (i.e., paper sheet 25 carrying the output image) from printer 24 is inputted to sheet feeder mechanism 31 of character reader 3. Sheet feeder mechanism 31 feeds input sheet 25 at a fixed speed, for instance. The image on sheet 25 fed by sheet feeder mechanism 31 is converted by CCD unit 323 into image data. CCD unit 32 includes a line CCD, for instance, to scan input sheet 25 so as to obtain digital data from the image data. Line buffer memory 33 is a bit map memory having a capacity corresponding to, for instance, one line image (i.e., 9120 dots in each row and 128 dots in each column). Image data from CCD unit 32 is stored in line buffer memory 33. The image data held in line buffer memory is supplied to reader 34. Reader 34 discriminates characters contained in the image held in line buffer memory 33. Code data provided from reader 34 is stored in floppy disk unit 39 connected to character reader 3.

Area buffer memory 35 is connected to line buffer memory 33. Of the image data stored in line buffer memory 33 only the image in a sample area to be described later is transferred to area buffer memory 35. Detector 36 for checking whether a drop-out color used for a slip has been actually dropped out is connected to area buffer 35.

Controller 37 is connected to components 31 to 36. Controller 37 has a CPU, memories and peripheral circuits, and it controls the operation of the individual components noted above. A sheet feed out signal from controller 37 is supplied to OR gate 38. To OR gate 38 are also supplied a slip feed out signal from a reset switch provided in character reader 3 and also a slip feed out signal from controller 37. The output signal of OR gate 38 is supplied to sheet feeder mechanism 31. Sheet feeder mechanism 31 feeds out or ejects input paper sheet 25 in response to the output signal of OR gate 38.

Now, an example of the slip used for this system will now be described with reference to FIG. 2. Reference marks 42a and 42b are printed on the upper side of slip 41. These reference marks are provided for the purpose of calculation of the inclination of the slip, and elongation/contraction ratio between the image after photoelectric conversion and original.

Line marks 43a to 43e for designating readout rows are printed along the left edge of slip 41.

Areas, in which characters may be written by the operator, are provided along lines indicated by marks 43c to 43e. Frames for writing characters are printed in drop-out color Cb in these areas. One character is to be written in one frame. To clarify the character-writing areas, a large frame surrounding each area is printed in drop-out color Ca.

Drop-out color sample area 44 is printed on slip 41 at a predetermined position thereof. In the example of FIG. 2, area 44 is printed along line indicated by mark 43b. The samples of all the drop-out colors used for slip 41 are printed in area 44. More specifically, the samples of all the drop-out colors present in the read-out rows indicated by marks 43a to 43d are printed in area 44. Specifically, squares are printed in drop-out colors Ca and Cb are printed in area 44. The color of the paper sheet of slip 41 appears in square area Cc of area 44.

Now, the operation of the image-processing system having the above structure will be explained with reference to FIG. 3.

The operator enters characters in frames printed in drop-out color Cb on slip 41. For example, the operator transfers the image on slip 41 shown in FIG. 3 from FAX 1a to FAX 2. The transferred image is received by input/output interface 21. The received data is demodulated by demodulator 22 to be held in page buffer memory 23. The image held in page buffer memory 23 is printed on predetermined paper sheet 25 by printer 24 under the control of controller 22, and printed paper sheet 25 is provided from FAX 2.

Paper sheet 25 provided from FAX 2 is input to sheet feeder mechanism 31 of character reader 3.

Sheet feeder 31 feeds input paper sheet 25. CCD unit 32 scans the paper sheet being fed by sheet feeder mechanism 31 for photoelectric conversion of the image on paper sheet 25 into image data. Controller 37 checks image data from CCD unit 32 to detect reference marks 42a and 42b printed on a head portion of the slip (step S1). Controller 37 calculates the inclination of the slip and performs other necessary operation from detected reference marks 42a and 42b to be used as a reference of the subsequent image processing (step S2). Controller 37 causes image data of the line containing sample area 44 to be stored in line buffer 33 according to detected reference marks 42a and 42b and format control data preliminarily stored in controller 37 (step S3).

Controller 37 reads out only image of sample area 44 by adequately controlling address data in line buffer 33 and transfers only the image of sample area 44 in the image held in line buffer 33 to area buffer 35 (step S4).

Detector 36 counts black bits (bit data "1") in area buffer 35 by scanning area buffer 35 under the control of controller 37 (step S5). The counting is performed, for example, by sequentially addressing the storage areas of area buffer 35 and incrementing the count of the counter when data "1" is read out.

When the black bit number obtained by detector 36 is greater than a predetermined reference value, detector 36 determined that the drop-out color is not dropped out and provides a "1"-level signal to OR gate 38. When the black bit number is less than the reference value, detector 37 determines that the drop-out color is dropped out and provides a "0"-level signal to OR gate 38.

The reference value noted above is an experimentally determined value. When the drop-out color is perfectly dropped out, no black bit will be present in area buffer 35. However, there is a possibility of generation of black bits in area buffer 15 due to such causes as noise and contamination of slip 41. For this reason, the reference value is set to be smaller than a comparatively small value other than zero. For example, when either one of drop-out colors Ca to Cc in slip 41 shown in FIG. 2 is not dropped out, one-third of all the bits in area buffer 35 is "1". Hence, when using slip 41, the reference value is set to a value smaller than one-third of the total bit number of area buffer 35, e.g., one-fourth.

When a "138-level signal is supplied from detector 36, OR gate 38 provides a slip feed out command to sheet feeder mechanism 31. In response to this command, sheet feeder mechanism 31 quickly feed out paper sheet 25 (step S7). Also, in response to the "1"-level signal from determination circuit 36, alarm 39 operates a buzzer to instruct that the drop-out colors are not drop out. Controller 37 stops the reading operation with respect to this slip and waits for the input of the next slip.

When a "0"-level signal is supplied form detector 36, OR gate 38 does not provide any command. Thus, paper sheet 25 is fed normally. Characters (53200, 6240, 21400, 500) written in the lines indicated by marks 43c to 43d under the control of controller 37 are sequentially stored in line buffer 33. The characters stored in line buffer 33 are read out by reader 34 for conversion into code data (step S8). The code data thus obtained is stored in floppy disk unit 39.

In this embodiment, when any drop-out color is not dropped out, slip 41 is automatically fed out before it is subjected to reading in character reader 34. Thus, even if any drop-out color is not dropped out, the operator is not required to do any slip feed out work. Thus, it is possible to obtain a smoother slip-reading process and reduce the operator's burden. Further, since a check as to whether the drop-out colors have been actually dropped out is done before the reading of the characters entered on slip 41, no wasteful reading operation is executed, and very efficient operation can be obtained.

Now, a second embodiment of the invention will be described with reference to FIG. 4. This embodiment concerns a structure of reading out image data received by FAX 2 with a character reader without printing out the data. In FIG. 4, parts like those in FIG. 1 are designated by like reference numerals, and their are not described. In this instance, the output of page buffer 23 is directly supplied to line buffer 33. The output of OR gate 38 is supplied to a clear terminal of page buffer 23.

The operation of the construction shown in FIG. 4 will be described. Even with this structure, the received image data is temporarily stored in page buffer 23. Of the image stored in page buffer 23, that in the line containing drop-out color sample area 44 is transferred to line buffer 33 under the control of controller 37. Of the image transferred to line buffer 33 only the image in drop-out color sample area 44 is transferred to area buffer 36. Like the previous first embodiment, detector 36 checks whether the drop-out colors have been actually dropped out.

When any drop-out color is not dropped out, detector 36 provides a "1"-level signal. In response to the "1"-level signal, alarm 39 effects a predetermined alarm, and OR gate 38 outputs a "1"-level signal to the clear terminal of page buffer 23. Page buffer 23 clears the image on the slip. Further, controller 37 stops the reading operation with respect to that slip.

When the drop-out colors are dropped out, detector 36 provides a "0"-level signal. In this case, controller 37 transfers the line image (53200, 6240) specified by line mark 43c to line buffer 33. Reader 34 reads out characters held in line buffer 33 and stores corresponding code data in floppy disk 39. Subsequently, the characters written in the lines indicated by marks 44d and 44e are read out.

Figure 5:
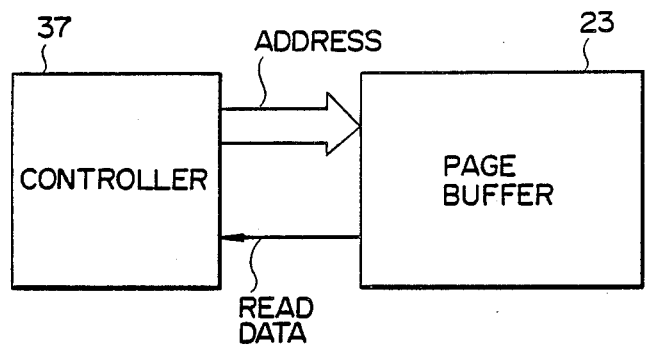
FIG. 5 is a block diagram showing the structure of a third embodiment of the image-processing system according to the invention.

In this embodiment, a peculiar structure according to the invention, i.e., area buffer 35, detector 36, etc., are provided in character reader 3. However, this is by no means limitative; for instance, controller 37 may directly check whether the drop-out colors are dropped out. Such an embodiment is shown in FIG. 5. In this instance, controller 37 provides address data through suitable control so that only the image of sample area in image stored in page buffer 23 is read out. Controller 37 accumulates read-out image data and effects a check as to whether the drop-out color have been dropped out through comparison of the result of accumulation to the reference value.

In the above embodiment, the image of sample area 44 is transferred to area buffer 35, but this is by no means limitative. For instance, the image of a portion printed in color Ca can be transferred to area buffer 36 for checking whether color Ca has been dropped out, then the image of a portion printed in color Cb is transferred to area buffer 36 for checking whether color Cb has been dropped out, and then image of a portion in color Cc of the sheet is transferred to area buffer 36 to check whether color Cc has been dropped out. With this arrangement, it is possible to vary each color area of the drop-out color sample area by varying the reference value for each color, and to inform the operation which colors have not been dropped out.

Figure 6:
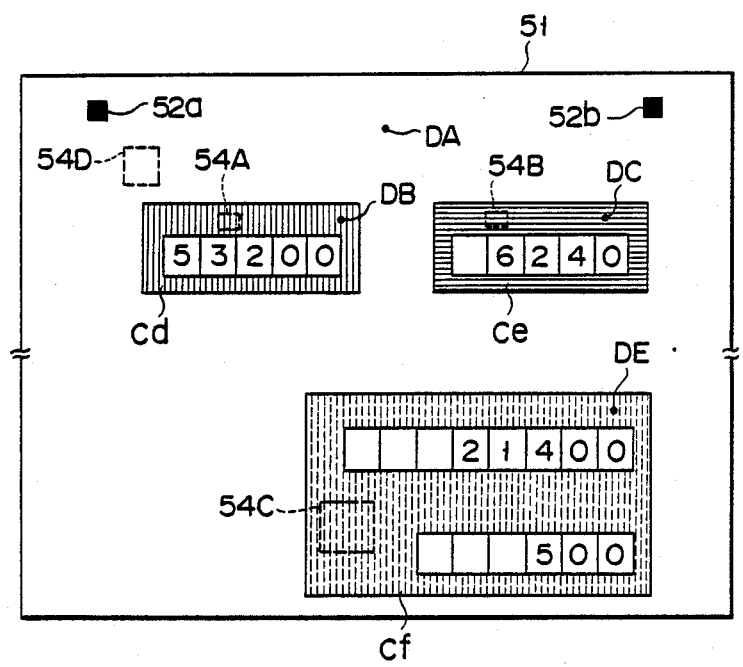
FIG. 6 is a view showing a different example of the slip dealt with according to the invention.

In the above embodiments, slip 41 is provided with drop-out color sample area 44. However, there is no need for particularly providing any sample area. For example, as shown in FIG. 6, part of the frames printed in drop-out colors may be used as a drop-out color sample area. For example, on slip 51 shown in FIG. 6 frames are printed in three different drop-out colors Cd, Ce and Cf. Of these frames, predetermined portions 54A to 54 C are used as drop-out color sample areas. Area 54D is provided for a check as to whether the color of the paper sheet has been dropped out. In this embodiment, controller 37 reads out image in of area 54A from page buffer memory 23 and effects a check as to whether color Cd has been dropped out through comparison of the number of black dots to a reference value. Subsequently, controller 37 effects sequential checks as to whether colors Ce and Cf and color of the sheet have been dropped out from the respective images of areas 54B to 54D.

In the above embodiments, a sample area is used. However, this is by no means limitative. For example, it is possible to arrange such that of the dots constituting the image of the slip shown in FIG. 6 (dots Da to Dd) are sequentially read out and it is determined that the drop-out colors have been dropped out if all the dots are "0". In this case, there is a possibility of presence of black dots at the position of detection due to contamination of the slip. Therefore, it is necessary to check image data of a plurality of dots at different positions with respect to each drop-out color.

The above embodiments are concerned with a case in which failure of the drop-out of drop-out colors used for a slip at the time of the transfer of the slip image with a FAX apparatus is liable due to the characteristics of the photoelectric converter of the FAX apparatus. However, this is by no means limitative. For example, the FAX apparatus may be omitted, that is, the invention can be attained solely with the character reader. For example, in a case when a slip having a print area printed in a color, which will not be dropped out by the character reader, is inputted to the character reader, according to the invention, this slip is discharged before the reading operation, so that a very quick operation can be obtained. Generally, the invention is applicable to any image-processing apparatus for dealing with a slip having an area printed in a drop-out color.

According to the invention, in the event of the failure of drop-out of any drop-out color the event is informed of, and, if necessary, the slip is discharged from the image-processing apparatus.

Thus, it is possible to provide an image-processing system, which is simply operable without need of any operator's slip discharge work.

What is claimed is:

1. A character reader comprising:
   receiving means for receiving an image of a slip obtained through photoelectric conversion from an apparatus connected through communication lines, said slip having a print area printed in a predetermined drop-out color and a predetermined format, characters being entered in said slip in conformity to said format;

image memory means coupled to said receiving means for storing an image received by said receiving means and represented by a plurality of dots;

character reader means coupled to said image memory means for reading out characters contained in the image stored in said image memory means;

drop-out determination means coupled to said image memory means for effecting a check as to whether said drop-out color has been dropped out at the time of said photoelectric conversion according to the image of said print area printed in said drop-out color among the image stored in said image memory means; and control means for stopping a character-reading operation of said character reader means with respect to a slip when said drop-out determination means determines that failure drop-out of said drop-out color according to the result of determination of said drop-out determination means.

2. The character reader according to claim 1, wherein;

said slip has a sample area provided at a predetermined position and with a print of a sample of said drop-out color, and said drop-out determination means includes:

area memory means connected to said image memory means, for storing an image of said sample area, which has been transferred from said image memory means;

counting means connected to said area memory means for counting black dots among the dots constituting the image of said sample area; and means for receiving count data from said counting means, comparing the number of black dots counted by said counting means to a reference value and determining that said drop-out color has not been dropped out when the counted black dot number in greater than said reference value.

3. The character reader according to claim 1, wherein said drop-out determination means includes:

dot number counter means connected to said image memory means for counting the number of black dots constituting an image in a predetermined portion of a print area printed in said drop-out color; and means for receiving count data from said counting means, comparing the number of black dots counted by said counting means to a reference value and determining that said drop-out color has not been dropped out when the counted black dot number is greater than said reference value.

4. The character reader according to claim 1, wherein said receiving means includes:

a facsimile apparatus for receiving an image of a slip transmitted from a different facsimile apparatus and providing a paper sheet with a print of said received image;

converter means for photoelectrically converting the image on said paper sheet provided from said facsimile apparatus into image data; and means connected to said converter means and image memory means for storing image data obtained from said converter means in said image memory means.

5. The character reader according to claim 1, wherein said slip has a sample area provided at a predetermined position and with a print of a sample of said drop-out color;

said receiving means includes:

a facsimile apparatus for receiving the image of said slip transmitted from a different facsimile apparatus and providing a paper sheet with a print of the received image;

sheet feeder means for feeding said printed paper sheet from said facsimile apparatus;

converter means for photoelectrically converting the image on said printed paper sheet from said sheet feeder means into image data; and means connected to said converter means and image memory means for storing image data obtained from said converter means to said image memory means; and said drop-out determination means includes:

area memory means connected to said image memory means, the image of said drop-out color sample area being transferred to and stored in said image memory means;

dot number counter means connected to said area memory means for counting black dots among the dots constituting the image of the drop-out color sample area stored in said area memory means;

comparator means for comparing the counted black dot number to a reference value according to the count data from said dot number counter means; and means for causing said sheet feed means to feed out the paper sheet from said character reader when it is determined from the result of comparison of said comparator means that said counted black not number is greater than said reference value.

6. The character reader according to claim 1, wherein, said receiving means includes:

a facsimile apparatus for receiving the image of said slip transmitted from a different facsimile apparatus and providing a paper sheet with a print of said received image;

sheet feeder means for feeding said printed paper sheet;

converter means for photoelectrically converting the image on said paper sheet fed from said sheet feeder means into image data; and means connected to said converter means for storing image data obtained from said converter means in said image memory means; and said drop-out determination means includes:

dot counter means connected to said image memory means for counting black dots in the dots constituting an image in a predetermined portion of the area with a print of said drop-out color;

comparator means connected to said dot counter means for comparing the counted dot number to a reference value; and means for causing said sheet feed means to feed out the paper sheet from said character reader and stopping the character-reading operation of said character reader means with respect to said slip when it is determined from the result data of said comparator means that the counted black dot number is greater than said reference value.

7. The character reader according to claim 1, wherein said drop-out determination means further includes alarm means for alarming failure of drop-out of said drop-out color when said failure take.

8. An image processing system comprising:
image formation means for obtaining the image of a slip with areas printed in a drop-out color;
image memory means for receiving the image of the slip and storing the image;
determination means for making a check as to whether said drop-out color has been dropped out according to the image stored in said image memory means; and
image-processing means, in response to the result of determination of said determination means, for performing a predetermined image processing when said drop-out color has been dropped out and for stopping said image processing with respect to the pertinent slip when said drop-out color has not been dropped out.

9. The system according to claim 8, wherein said slip has a sample area provided at a predetermined position and with a print of a sample of said drop-out color; and said determination means includes:
dot number detector means for detecting black dots among the dots constituting the image of said sample area in the image stored in said image memory means; and
recognition means for comparing the detected block dot number to a reference value in response to the result of detection by said dot number detection means and recognizing the failure of drop-out of said drop-out color when said detected black dot number is greater than said reference value.

10. The system according to claim 9, wherein said image formation means includes:
a facsimile apparatus for receiving the image of said slip transmitted from a different facsimile apparatus and providing a paper sheet with the received image;
sheet feeder means for feeding the paper sheet from said facsimile apparatus;
conversion means for converting the image on the paper sheet form said sheet feeder means into image data;
means for storing image data from said image memory means in said conversion means; and
means for causing said paper sheet to be ejected to said sheet feeder means when it is recognized that said drop-out color has not been dropped out.

11. The system according to claim 8, wherein said determination means includes:
dot number detector means for detecting black dots among the dots constituting the image in a predetermined portion of an area of print in said drop-out color among the image stored in said image memory means; and
means for comparing the black dot number detected by said dot number detector means to a reference value and recognizing the failure of drop-out of said drop-out color when said detected black dot number is greater than said reference value.

12. The system according to claim 11, wherein said image formation means includes:
a facsimile apparatus for receiving the image of said slip transmitted to a different facsimile apparatus and providing a paper sheet with a print of said received image;
sheet feeder means for feeding said printed paper sheet provided from said facsimile apparatus;
means for starting image data obtained from said conversion means to said image memory means; and
means for causing said sheet feed means to feed out the paper sheet from the character reader when said recognition means recognizes the failure of drop-out of said drop-out color.

13. A method of image processing comprising the steps of:
photoelectrically converting the image of a slip having a drop-out color sample area with print in said drop-out color;
checking whether said drop-out color has been dropped out according to image data obtained as a result of said photoelectric conversion; said checking including the steps of detecting black dots among the dots constituting the image of said drop-out color sample area, comparing the black dot number detected in said dot number detection step to a reference value and determining that said drop-out color has not been dropped out if the black dot number is greater than said reference value; and
performing a predetermined image processing if said drop-out color is found to be dropped out as a result of said check, while stopping said image processing with respect to the pertinent slip when said drop-out color is not found to be dropped out.

14. A method of image processing comprising the steps of:
photoelectrically converting the image of a slip with an area of print in a drop-out color;
checking whether said drop-out color has been dropped out according to image data obtained as a result of said photoelectric conversion; said checking including the steps of detecting black dots among the dots constituting the image of a predetermined portion of an area with print in said drop-out color on said slip, comparing the black dot number detected in said dot detection step to a reference value and determining that said drop-out color has not been dropped out when said detected said black dot number is greater than said reference value; and
performing a predetermined image processing if said drop-out color is found to be dropped out as a result of said check, while stopping said image processing with respect to the pertinent slip when said drop-out color is not found to be dropped out.

* * * * *